(12) United States Patent
Eaton

(10) Patent No.: US 6,759,816 B2
(45) Date of Patent: Jul. 6, 2004

(54) TAPE DRIVE WITH NON-CONTACT OPTICAL TAPE TENSION SENSOR

(75) Inventor: James H. Eaton, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 39 days.

(21) Appl. No.: 10/232,587

(22) Filed: Aug. 30, 2002

(65) Prior Publication Data

US 2004/0041528 A1 Mar. 4, 2004

(51) Int. Cl.[7] .............................................. B65H 77/00
(52) U.S. Cl. ........................... 318/6; 318/480; 242/334
(58) Field of Search ................................ 318/6, 7, 480; 242/324, 333, 333.3, 333.7, 334, 334.6, 352

(56) References Cited

U.S. PATENT DOCUMENTS

| | | | |
|---|---|---|---|
| 4,408,144 A | 10/1983 | Lukes | |
| 4,501,642 A * | 2/1985 | Wells | 162/198 |
| 4,557,435 A * | 12/1985 | Reishus | 242/410 |
| 4,842,177 A | 6/1989 | Callendar et al. | |
| 6,543,288 B1 * | 4/2003 | Blouin et al. | 73/643 |
| 6,564,983 B2 * | 5/2003 | Ludwig | 226/45 |

FOREIGN PATENT DOCUMENTS

| | | |
|---|---|---|
| JP | 08122176 A | 5/1996 |
| JP | 2001035046 A | 2/2001 |

OTHER PUBLICATIONS

"Vacuum Puffer Head to Prevent Tape Stick on Magnetic Head", IBM Technical Disclosure Bulletin, May 1988, pp. 242–243.
"Tape Tension Detection", IBM Technical Disclosure Bulletin, Nov. 1983, pp. 2990–2991.

* cited by examiner

Primary Examiner—Bentsu Ro
(74) Attorney, Agent, or Firm—Thomas R. Berthold; Daniel E. Johnson

(57) ABSTRACT

The invention is a non-contact optical tape tension sensor for a tape drive. A light source directs an incident beam to the tape in a region of the tape path near where the tape bends. The amount of divergence of the reflected light is related to the curvature of the tape, and thus to the tape tension. The reflected light is passed through an aperture to a photodetector that detects the amount of the divergent beam passing through the aperture. The photodetector output is input to the tape drive controller that controls the currents to the supply and take-up motors to thereby maintain the tape tension within the desired range.

6 Claims, 4 Drawing Sheets

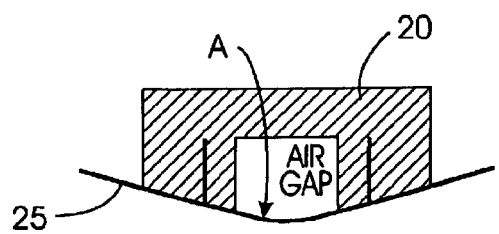
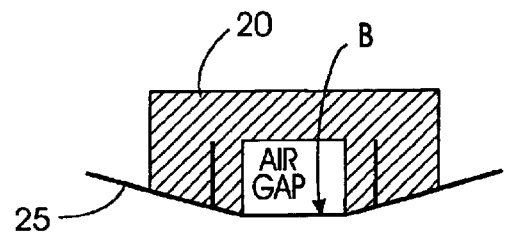
FIG. 3A  FIG. 3B
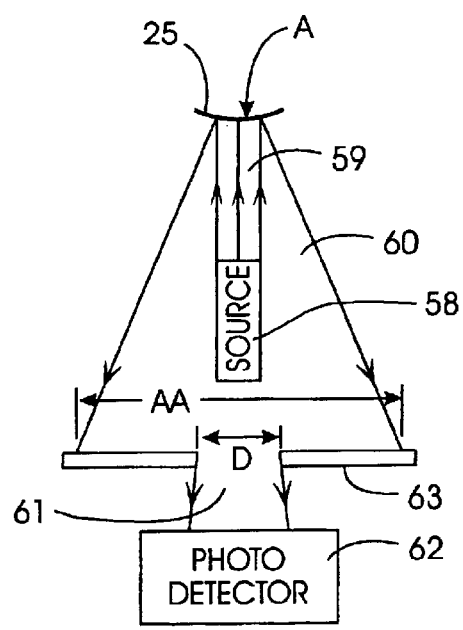
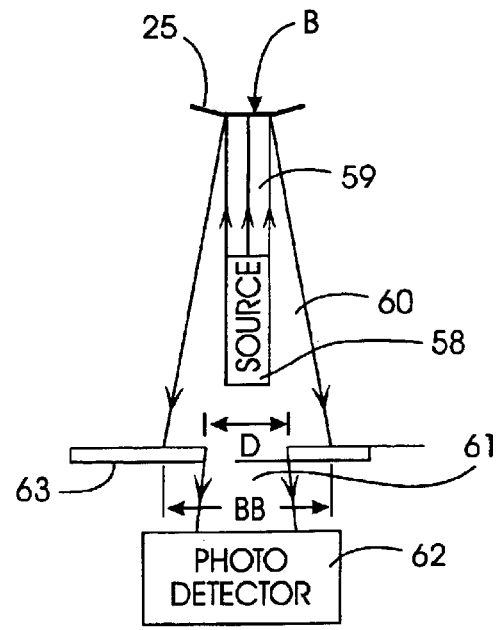
FIG. 4A  FIG. 4B

TAPE DRIVE WITH NON-CONTACT OPTICAL TAPE TENSION SENSOR

TECHNICAL FIELD

This invention relates generally to tape drives, and more particularly to a magnetic recording tape drive with an improved system for detecting and controlling tape tension.

BACKGROUND OF THE INVENTION

In tape recording systems, such as reel-to-reel type magnetic recording tape drives, the tape tension and velocity are controlled to provide a stable recording speed as well as a stable distance between the recording head and the recording surface of the tape. In low performance tape drives with relatively low accelerations to bring the tape up to the desired velocity, direct measurement of tape tension is not required. This is because a tape tension signal can be derived from the motor torque vs. current characteristics for the supply and take-up motors and from the supply and take-up reel speeds, which are inversely proportional to the diameters of the tape packs on the tape reels.

A typical magnetic recording tape drive, wherein tape tension and velocity are controlled, is shown schematically in FIG. 1. The tape drive includes a tape supply reel 15 containing tape pack 13 and driven by supply motor 16, a tape take-up reel 17 containing tape pack 14 and driven by take-up motor 18, a recording head 20 and guides, 22, 24 for guiding the tape 25 past the recording head 20. Tachometers 26a, 26b for the supply motor 16 and take-up motor 18, respectively, continually sense the supply and take-up motor speeds. A controller 30 provides output signals 23, 27 to control the motor currents to supply motor 16 and take-up motor 18, respectively. An estimator 34 is used to provide the required tape tension signal 35 and tape velocity signal 37 which are input into controller 30. The estimator 34 receives motor speed signals 31, 33 from tachometers 26a, 26b respectively, and motor current signals 23, 27 from controller 30. The estimator 34 uses the motor speed inputs (to determine the diameters of the tape packs 13, 14) and the motor current inputs (with known motor torque vs. current characteristics) to estimate the tape tension, which is fed back as signal 35 into controller 30. The estimator 34 also provides an estimate of tape velocity as signal 37 input to controller 30. A tape tension control system that estimates tape pack diameters to control motor currents is described in U.S. Pat. No. 4,408,144.

Tape drives like those depicted in FIG. 1, such as the current linear-tape-open (LTO) tape drives, do not require direct measurement of tape tension and thus do not have a separate tape tension sensor. However, future generations of type drives, especially high performance tape drives with high acceleration to bring the tape up to the desired velocity, will require direct measurement of tape tension to handle the thinner tapes that will be used. Some tape drives, like the IBM 3590, use a fixed pin tape guide in the tape path and measure tape tension directly by measuring the air pressure between the tape and the fixed pin guide. This type of direct tape tension measurement is described in U.S. Pat. No. 4,842,177. However, in tape drives such as the IBM LTO tape drive that use rollers as tape guides in the tape path instead of fixed pins, it is not possible to measure air pressure between the tape and the rollers.

Other alternatives for directly measuring tape tension have been proposed that require physical contact with the tape and/or additional components in the tape path. These include tension arms, strain gauges on roller mounts, and optical measurement of tape displacement in a flat region of the tape path. The use of an optical sensor to measure tape displacement in a flat region of the tape path is described in "Vacuum Puffer Head to Prevent Tape Stick on Magnetic Head", *IBM Technical Disclosure Bulletin*, May 1988, pp. 242–243 and "Tape Tension Detection", *IBM Technical Disclosure Bulletin*, November 1983, pp. 2990–2991, both of which require the use of a vacuum region in the tape path, in Japanese published patent application JP-08122176A (May 17, 1996) that requires an air blower in the tape path, and in Japanese published patent application JP-2001035046A (Feb. 9, 2001) that measures tape width.

What is needed is tape drive with a tape tension sensor that does not require physical contact with the tape or additional rollers, guides or other components in the tape path.

SUMMARY OF THE INVENTION

The invention is a non-contact optical tape tension sensor for a tape drive. A light source directs an incident beam to the tape in a region of the tape path near where the tape bends. The amount of divergence of the reflected light is related to the curvature of the tape, and thus to the tape tension. The reflected light is passed through an aperture to a photodetector that detects the amount of the divergent beam passing through the aperture. The photodetector output is input to the tape drive controller that controls the currents to the supply and take-up motors to thereby maintain the tape tension within the desired range.

For a fuller understanding of the nature and advantages of the present invention, reference should be made to the following detailed description taken together with the accompanying figures.

BRIEF DESCRIPTION OF THE DRAWING

FIGS. 3A–3B show the two extremes of curvature the tape can experience when passing over the flat contour recording head.

FIGS. 4A–4B show the two extremes of the reflected divergent beam at the aperture plate corresponding to the two extremes of tape curvature of FIGS. 3A–3B, respectively.

DETAILED DESCRIPTION OF THE INVENTION

Figure 1:
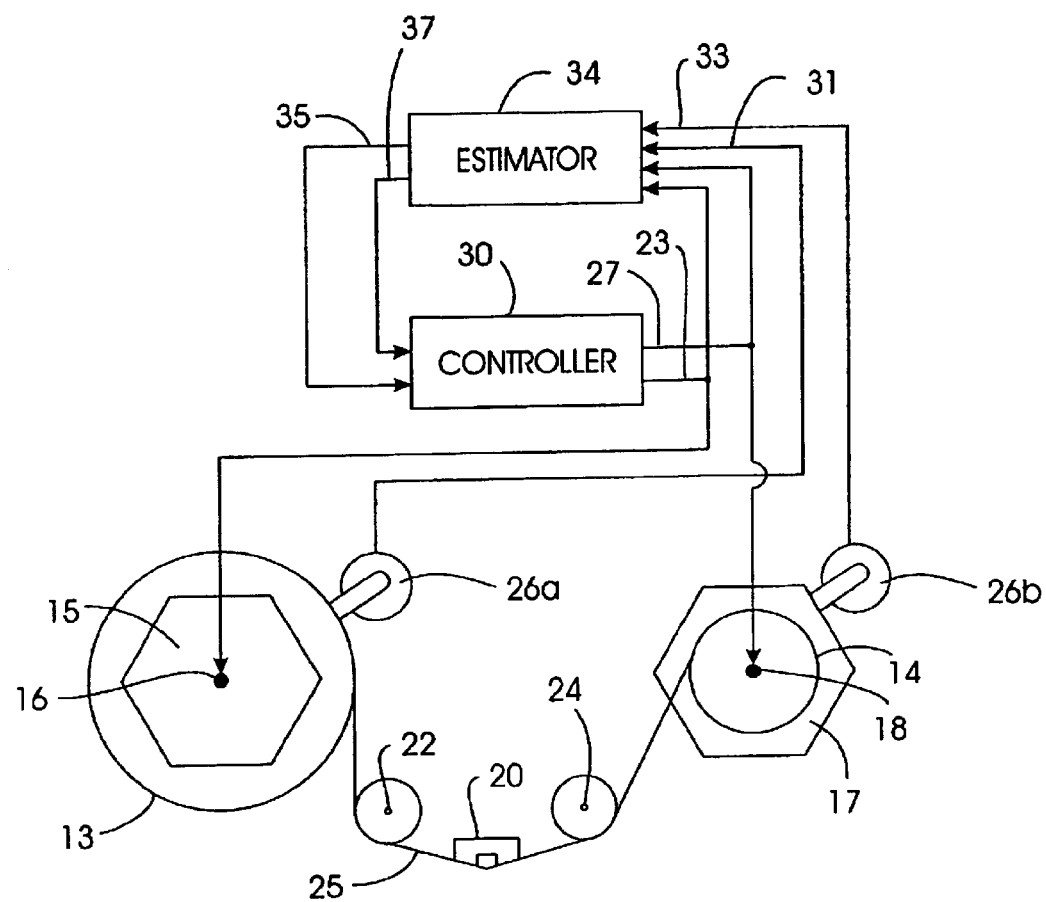
FIG. 1 is a schematic of a prior art tape drive showing an estimator of tape tension input in communication with a controller that controls the motor currents to the supply and take-up motors.
Figure 2:
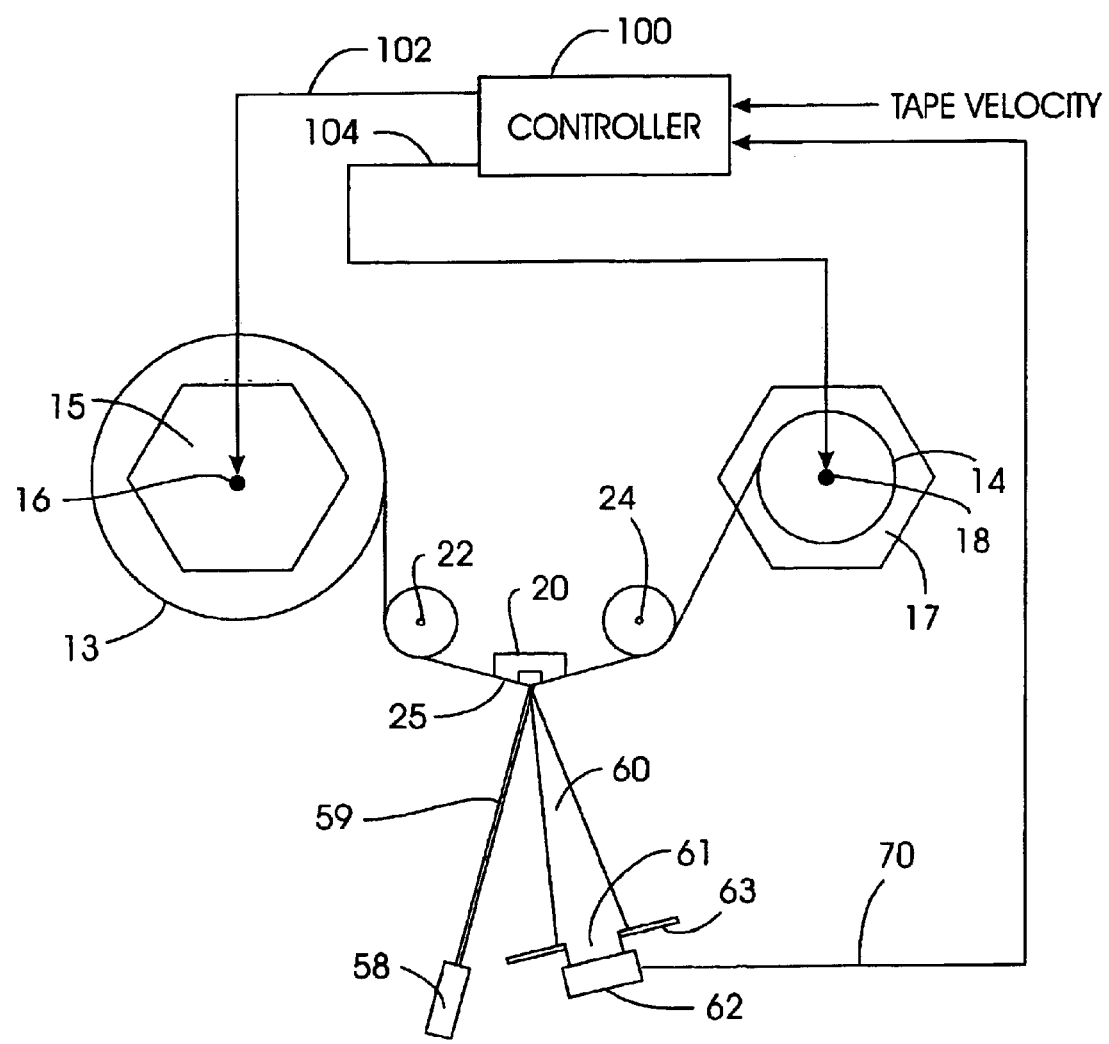
FIG. 2 is a schematic of the tape drive of the present invention showing the non-contact optical tape tension sensor that provides direct input to the controller that controls the motor currents to the supply and take-up motors.

FIG. 2 is a schematic of the tape drive employing the non-contact optical tension sensor of the present invention. A light source 58 directs an incident beam 59 to an area of the tape 25 in a region of the tape path where the tape bends, such as near the recording head 20, where the radius of curvature of the tape 25 is especially sensitive to tape tension. In FIG. 2, the light is incident on the tape at the air gap between the tape 25 and the head 20. The reflected light from the tape is a divergent beam 60 that is directed to a photodetector 62 through an aperture 61 in aperture plate 63. The output 70 from photodetector 62 is input to controller 100 as a direct measurement of tape tension. Controller 100 provides motor current signals 102, 104 to supply motor 16 and take-up motor 18, respectively, to control the tape tension within the desired range. Controller 100 may also receive a tape velocity input signal, which can be derived as explained with respect to the prior art of FIG. 1, for the purpose of controlling tape velocity.

FIGS. 3A–3B show in more detail the two extremes of tension the tape 25 can experience when passing over the flat contour recording head 20. When the tape is under low tension (FIG. 3A), its curvature changes from being tangent to the head at the first edge of the air gap to a relatively large curved shape near the center of the air gap and then tangent to the head again at the second edge of the air gap. This results in a relatively small radius of curvature A near the center of the air gap. When the tape is under high tension (FIG. 3B) it is quickly pulled down to nearly horizontal at the air gap, producing a nearly flat large radius of curvature B in the area near the center of the air gap.

The reflected diverging beam corresponding to the two extremes of FIGS. 3A–3B are depicted in FIGS. 4A–4B. An aperture plate 63 is located in the divergent reflected beam 60 and a photodetector 62 is located behind the aperture plate 63. The aperture 61 in plate 63 is preferably a slit with a width D. If the tape has a small radius of curvature because it is under low tension (FIG. 3A), the reflected beam is highly divergent and strikes aperture plate 63 with a diameter AA and with relatively little of the divergent beam 60 passing through the aperture and onto the photodetector 62. This is shown in FIG. 4A. If the tape has a large radius of curvature because it is under high tension (FIG. 3B), the reflected beam is only slightly divergent and strikes aperture plate 63 with a diameter BB and with a relatively large portion of the divergent beam 60 passing through the aperture 61 and onto the photodetector 62. This is shown in FIG. 4B.

FIGS. 4A–4B thus illustrate the technique to detect different curvatures of the tape, and thereby different tape tensions. The light source 58 directs a collimated incident beam 59 onto tape 25, with the tape having a radius of curvature A in FIG. 4A and a radius of curvature B in FIG. 4B. If the tape were perfectly flat, the reflected light from the tape would not be divergent and all of the light reflected from the tape would pass through the aperture and onto the photodetector. When a tape with a small radius of curvature A is illuminated, the reflected beam spans a width AA when it arrives at the aperture plate 63 and approximately R(D/AA) of the light from the light source 58 arrives at the photodetector 62, where R is the reflectance of the tape surface at the wavelength of the light source 58. When a tape with a large radius of curvature B is illuminated, the reflected beam spans a width BB when it arrives at the aperture plate 63 and approximately R(D/BB) of the light from the light source 58 arrives at the photodetector 62. Thus the intensity of the light arriving at the photodetector 62 is function of the curvature of the tape and thus its tension.

Figure 5:
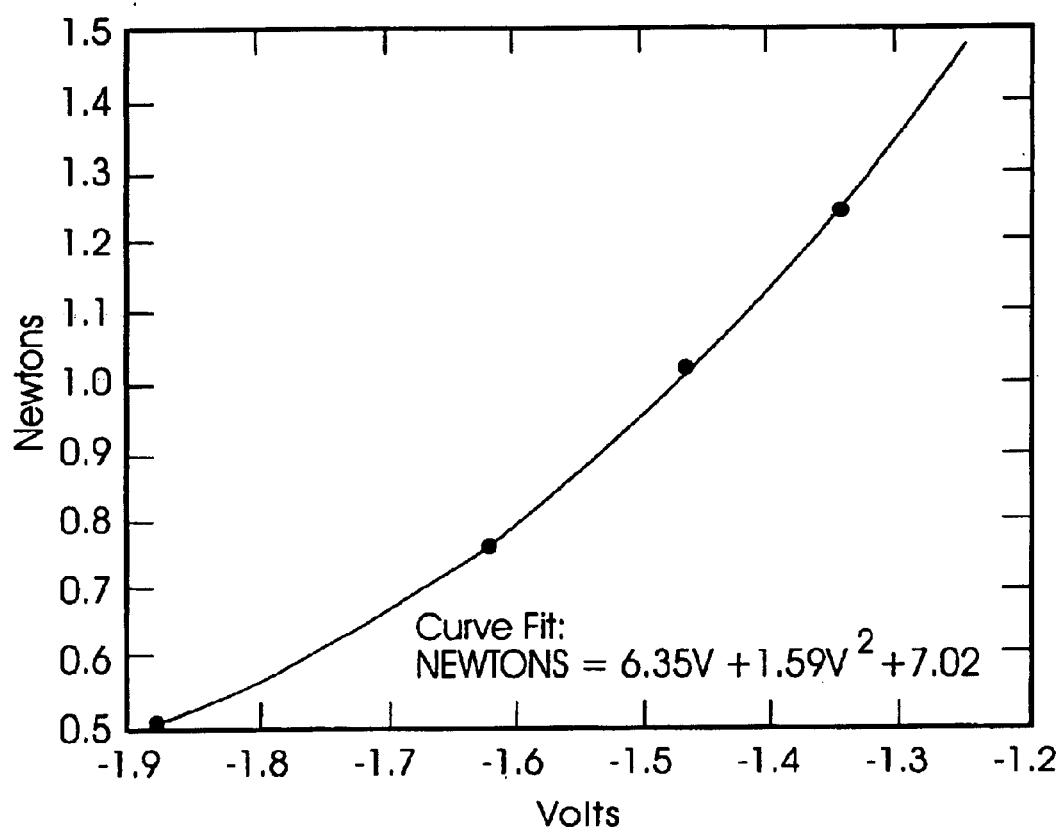
FIG. 5 is a calibration curve of tape tension vs. photodetector output voltage for an experimental tape drive incorporating the tape tension sensor of the present invention.

In an actual sensor incorporated into an experimental tape drive, a 670 nm 1 mw solid state laser was used to generate an incident beam with a diameter of approximately 1 mm at the tape. The aperture was a 0.5 mm slit. The unexpanded beam at the aperture, if it had been reflected off a plane mirror, would be approximately 1 mm. The total length of the optical path was approximately 100 mm. The photodetector was a UDT brand Model 13DPI. FIG. 5 shows the measured tape tension for several photodetector voltages for this experimental tape drive and the resulting curve fit. The tape tension/detector voltage relationship of FIG. 5 is used by the controller 100 as part of the process for generating the motor current control signals 102, 104.

In the embodiment shown and described the tape tension sensor, which comprises the light source, aperture plate and photodetector, is mounted to and integrated into the tape drive, with its output directed into controller 100 to control motor currents to the supply motor 16 and take-up motor 18. However, it is also within the scope of the present invention that the sensor can be a separate unit that is removably attached to the tape drive for the purpose of measuring tape tension during testing or maintenance, in which case the photodetector output can be used to measure tape tension.

The embodiment shown and described has the beam incident in the region of the tape head. However, the beam can be incident on the tape at other locations in the tape path where the tape bends, such as near a guide or any location when the tape "breaks" from a predominantly straight or flat path. In addition, while the embodiments is shown with the incident beam and center of the reflected beam being essentially normal to the tape, the invention is fully operable if the light source is located to one side of the normal and the photodetector to the other side.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A sensor for detecting the tension of tape in a tape drive having a recording head, comprising:
    a light source having light directed to the tape, wherein the light is incident on a portion of the tape near the tape drive's recording head; and
    a detector for detecting the intensity of light reflected from the tape, the detected light intensity being a function of the curvature of the tape in the region of the incident light.

2. The sensor of claim 1 further comprising a plate having an aperture located in the path of the reflected light, wherein only light passing through the aperture is received by the detector.

3. A magnetic recording tape drive comprising:
    a tape supply reel;
    a tape supply motor for driving the supply reel;
    a tape take-up reel for taking up magnetic tape from the supply reel;
    a take-up motor for driving the take-up reel;
    a magnetic recording head for recording on the tape moving from the supply reel to the take-up reel;
    a controller responsive to the tension of the tape between the supply and take-up reels for controlling the supply and take-up motors; and
    the sensor of claim 1, wherein the output of the detector is coupled to the controller for providing a signal representative of the tension of the tape.

4. A magnetic recording tape drive comprising:
    a tape supply reel;
    a tape supply motor for driving the supply reel;
    a tape take-up reel for taking up magnetic tape from the supply reel;

a take-up motor for driving the take-up reel;

a magnetic recording head for recording on the tape when the tape moves along a path from the supply reel to the take-up reel, wherein the recording head is configured such that curvature in the tape is induced in a region of the tape located near the recording head;

a light source having light directed to said region of the tape near the recording head;

a photodetector for detecting the intensity of light reflected from the tape, the detected light intensity being a function of the curvature of the tape; and a controller coupled to the photodetector and responsive to the detected light intensity for controlling current to the supply and take-up motors to thereby control the tape tension.

5. The magnetic recording tape drive of claim 4 further comprising a plate having an aperture located in the path of the reflected light, wherein only light passing through the aperture is received by the photodetector.

6. The magnetic recording tape drive of claim 5 wherein the aperture is a slit.

* * * * *